(12) United States Patent
Kadambala et al.

(10) Patent No.: US 11,895,414 B1
(45) Date of Patent: Feb. 6, 2024

(54) VIRTUAL CHANNEL CONFIGURATION SESSION OF A CAMERA SENSOR

(71) Applicant: QUALCOMM Incorporated, San Diego, CA (US)

(72) Inventors: Ravi Shankar Kadambala, Hyderabad (IN); Tony Lijo Jose, Hyderabad (IN); Ravi Kishore Tanuku, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/817,427

(22) Filed: Aug. 4, 2022

(51) Int. Cl.
*H04N 25/46* (2023.01)
*H04N 23/65* (2023.01)
*H04N 25/42* (2023.01)

(52) U.S. Cl.
CPC ........... *H04N 25/46* (2023.01); *H04N 23/651* (2023.01); *H04N 25/42* (2023.01)

(58) Field of Classification Search
CPC ........ H04N 25/40; H04N 25/42; H04N 25/47; H04N 23/61; H04N 23/611; H04N 23/65; H04N 23/651; H04N 23/665; H04N 23/667
See application file for complete search history.

(56) References Cited

U.S. PATENT DOCUMENTS

| | | | | |
|---|---|---|---|---|
| 2011/0285866 | A1* | 11/2011 | Bhrugumalla | H04N 23/951 |
| | | | | 348/E5.024 |
| 2015/0199366 | A1* | 7/2015 | Marlatt | G06F 16/125 |
| | | | | 707/823 |
| 2015/0201198 | A1* | 7/2015 | Marlatt | H04N 19/124 |
| | | | | 375/240.03 |
| 2021/0037204 | A1* | 2/2021 | Moon | H04N 25/42 |
| 2021/0176396 | A1* | 6/2021 | Cha | H04N 23/665 |
| 2022/0070391 | A1* | 3/2022 | Duenyas | H04N 25/42 |
| 2022/0172375 | A1* | 6/2022 | Seo | H04N 25/46 |
| 2023/0049339 | A1* | 2/2023 | Ganguly | G06V 10/75 |

FOREIGN PATENT DOCUMENTS

JP 2016167109 A 9/2016

* cited by examiner

*Primary Examiner* — Paul M Berardesca
(74) *Attorney, Agent, or Firm* — Muncy, Geissler, Olds & Lowe, P.C./Qualcomm (57) ABSTRACT

In an aspect, camera sensor component receives, during a multi-virtual channel (VC) configuration session, a first configuration of a first VC associated with a first binning mode (e.g., full, 4×4, 8×8, etc.) and a second configuration of a second VC, the second configuration associated with a second binning mode (e.g., full, 4×4, 8×8, etc.). The camera sensor component detects trigger(s) to initiate streaming of activity frames associated with the first VC and the second VC. In response to the trigger(s), the camera sensor component streams first activity frames associated with the first VC in accordance with the first binning mode, and streams second activity frames associated with the second VC in accordance with the second binning mode.

30 Claims, 5 Drawing Sheets

VIRTUAL CHANNEL CONFIGURATION SESSION OF A CAMERA SENSOR

BACKGROUND OF THE DISCLOSURE

1. Field of the Disclosure

Aspects of the disclosure relate generally to wireless communications, and more particularly to camera sensor aspects.

2. Description of the Related Art

Extended reality (XR) camera sensors may be equipped on smart glasses to facilitate interaction with virtual reality systems (e.g., Metaverse, etc.). In some designs, the XR camera sensors may be used for various tracking use cases, such as head tracking (HET), hand tracking (HAT), plane finding (PF), and controller tracking (CT). In some designs, the same mono camera sensor may work on one of the tracking modes (e.g., HET/HAT/PF/CT) intermittently or periodically, while most of the time operating in accordance with a trigger mode (e.g., FSIN mode). For example, the trigger mode is a mode where a camera wakes up from sleep mode in response to some event, captures and streams a particular number of activity frames, and then goes to back to sleep mode. The trigger mode is generally used in tandem with the above-noted tracking use cases to improve power and performance.

In some designs, virtual channels (VCs) are used to stream data for each mode for a given camera sensor. For example, global shutter FSIN camera sensors may be configured to stream a single VC for a single FSIN trigger. For example, to stream a single VC, a global shutter FSIN camera sensor may be configured with a VC configuration that includes (i) a sensor resolution and frames per second (FPS), stream information (e.g., VC information), and an FSIN trigger (e.g., sensor settings, a global-purpose input output (GPIO) toggle, etc.).

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a camera sensor component includes receiving, during a multi-virtual channel (VC) configuration session, a first configuration of a first VC, the first configuration associated with a first binning mode; receiving, during the multi-VC configuration session, a second configuration of a second VC, the second configuration associated with a second binning mode; detecting one or more triggers to initiate streaming of activity frames associated with the first VC and the second VC; and in response to the one or more triggers, streaming first activity frames associated with the first VC in accordance with the first binning mode, and streaming second activity frames associated with the second VC in accordance with the second binning mode.

In an aspect, a camera sensor component includes a memory; at least one transceiver; and at least one processor communicatively coupled to the memory and the at least one transceiver, the at least one processor configured to: receive, via the at least one transceiver, during a multi-VC configuration session, a first configuration of a first VC, the first configuration associated with a first binning mode; receive, via the at least one transceiver, during the multi-VC configuration session, a second configuration of a second VC, the second configuration associated with a second binning mode; detect one or more triggers to initiate streaming of activity frames associated with the first VC and the second VC; and in response to the one or more triggers, stream first activity frames associated with the first VC in accordance with the first binning mode, and stream second activity frames associated with the second VC in accordance with the second binning mode.

In an aspect, a camera sensor component includes means for receiving, during a multi-virtual channel (VC) configuration session, a first configuration of a first VC, the first configuration associated with a first binning mode; means for receiving, during the multi-VC configuration session, a second configuration of a second VC, the second configuration associated with a second binning mode; means for detecting one or more triggers to initiate streaming of activity frames associated with the first VC and the second VC; and means for, in response to the one or more triggers, streaming first activity frames associated with the first VC in accordance with the first binning mode, and streaming second activity frames associated with the second VC in accordance with the second binning mode.

In an aspect, a non-transitory computer-readable medium storing computer-executable instructions that, when executed by a camera sensor component, cause the camera sensor component to: receive, during a multi-virtual channel (VC) configuration session, a first configuration of a first VC, the first configuration associated with a first binning mode; receive, during the multi-VC configuration session, a second configuration of a second VC, the second configuration associated with a second binning mode; detect one or more triggers to initiate streaming of activity frames associated with the first VC and the second VC; and in response to the one or more triggers, stream first activity frames associated with the first VC in accordance with the first binning mode, and stream second activity frames associated with the second VC in accordance with the second binning mode.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

Figure 1:
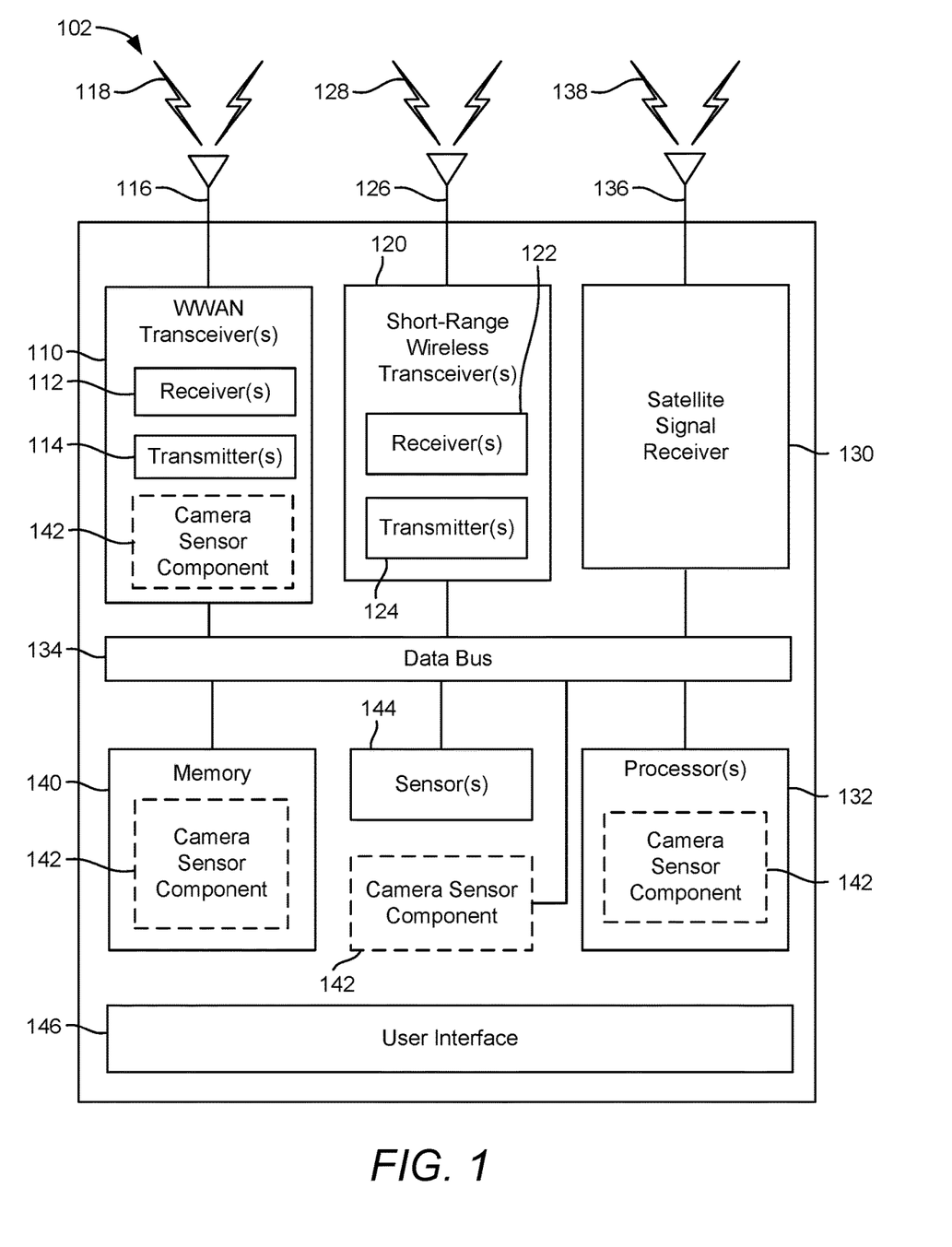
FIG. 1 is a simplified block diagram of several sample aspects of components that may be employed in a user equipment (UE), and configured to support communications as taught herein.

FIG. 1 illustrates several example components (represented by corresponding blocks) that may be incorporated into a UE 102. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies. In an aspect, UE 102 may correspond to aspects such as extended reality (XR) glasses, and various blocks depicted in FIG. 1 may be optional depending on implementation (e.g., transceivers, SPS components, etc. may be optional).

In some designs, UE 102 may optionally include one or more wireless wide area network (WWAN) transceiver 110, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceiver 110 may be connected to one or more antennas 116, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceiver 110 may be variously configured for transmitting and encoding signals 118 (e.g., messages, indications, information, and so on), respectively, and, conversely, for receiving and decoding signals 118 (e.g., messages, indications, information, pilots, and so on), respectively, in accordance with the designated RAT. Specifically, the WWAN transceiver 110 include one or more transmitters 114, for transmitting and encoding signals 118, and one or more receivers 112, for receiving and decoding signals 118.

The UE 102 may also optionally include, at least in some cases, one or more short-range wireless transceivers 120. The short-range wireless transceivers 120 may be connected to one or more antennas 126, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), ultra-wideband (UWB), etc.) over a wireless communication medium of interest. The short-range wireless transceivers 120 may be variously configured for transmitting and encoding signals 128 (e.g., messages, indications, information, and so on), and, conversely, for receiving and decoding signals 128 (e.g., messages, indications, information, pilots, and so on), respectively, in accordance with the designated RAT. Specifically, the short-range wireless transceivers 120 include one or more transmitters 124, for transmitting and encoding signals 128, and one or more receivers 122, for receiving and decoding signals 128. As specific examples, the short-range wireless transceivers 120 may be WiFi transceivers, Bluetooth® transceivers, Zigbee® and/or Z-Wave® transceivers, NFC transceivers, UWB transceivers, or vehicle-to-vehicle (V2V) and/or vehicle-to-everything (V2X) transceivers.

The UE 102 may also optionally include, at least in some cases, satellite signal receivers 130 and 170. The satellite signal receivers 130 may be connected to one or more antennas 136, and may provide means for receiving and/or measuring satellite positioning/communication signals 138. Where the satellite signal receivers 130 are satellite positioning system receivers, the satellite positioning/communication signals 138 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 130 are non-terrestrial network (NTN) receivers, the satellite positioning/communication signals 138 may be communication signals (e.g., carrying control and/or user data) originating from a 5G network. The satellite signal receivers 130 may comprise any suitable hardware and/or software for receiving and processing satellite positioning/communication signals 138. The satellite signal receivers 130 may request information and operations as appropriate from the other systems, and, at least in some cases, perform calculations to determine locations of the UE 102, using measurements obtained by any suitable satellite positioning system algorithm.

A transceiver may be configured to communicate over a wired or wireless link. A transceiver (whether a wired transceiver or a wireless transceiver) includes transmitter circuitry (e.g., transmitters 114, 124) and receiver circuitry (e.g., receivers 112, 122). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver may be coupled to one or more wired network interface ports. Wireless transmitter circuitry (e.g., transmitters 114, 124) may include or be coupled to a plurality of antennas (e.g., antennas 116, 126), such as an antenna array, that permits the respective apparatus (e.g., UE 102) to perform transmit "beamforming," as described herein. Similarly, wireless receiver circuitry (e.g., receivers 112, 122) may include or be coupled to a plurality of antennas (e.g., antennas 116, 126), such as an antenna array, that permits the respective apparatus (e.g., UE 102) to perform receive beamforming, as described herein. In an aspect, the transmitter circuitry and receiver circuitry may share the same plurality of antennas (e.g., antennas 116, 126), such that the respective apparatus can only receive or transmit at a given time, not both at the same time. A wireless transceiver (e.g., WWAN transceivers 110, short-range wireless transceivers 120) may also include a network listen module (NLM) or the like for performing various measurements.

As used herein, the various wireless transceivers (e.g., transceivers 110, 120, etc.) and wired transceivers may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 102) and another wireless device will generally relate to signaling via a wireless transceiver.

The UE 102 may also include other components that may be used in conjunction with the operations as disclosed herein. The UE 102 may include one or more processors 132 for providing functionality relating to, for example, wireless communication, and for providing other processing functionality. The processors 132 may therefore provide means for processing, such as means for determining, means for calculating, means for receiving, means for transmitting, means for indicating, etc. In an aspect, the processors 132 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 102 may include memory circuitry implementing memories 140 (e.g., each including a memory device), respectively, for maintaining information (e.g., information indicative of reserved resources, thresholds, parameters, and so on). The memory 140 may therefore provide means for storing, means for retrieving, means for maintaining, etc. In some cases, the UE 102 may include camera sensor component 142. The camera sensor component 142 may be hardware circuits that are part of or coupled to the processors 132, that, when executed, cause the UE 102, to perform the functionality described herein. In other aspects, the camera sensor component 142 may be external to the processors 132 (e.g., part of a modem processing system, integrated with another processing system, etc.). Alternatively, the camera sensor component 142 may be memory modules stored in the memories 140, that, when executed by the processors 132 (or a modem processing system, another processing system, etc.), cause the UE 102 to perform the functionality described herein. FIG. 1 illustrates possible locations of the camera sensor component 142, which may be, for example, part of the one or more WWAN transceivers 110, the memory 140, the one or more processors 132, or any combination thereof, or may be a standalone component.

The UE 102 may include one or more sensors 144 coupled to the one or more processors 132 to provide means for sensing or detecting movement and/or orientation information that is independent of motion data derived from signals received by the one or more WWAN transceivers 110, the one or more short-range wireless transceivers 120, and/or the satellite signal receiver 130, means for capturing visual data and/or image data, and so on. By way of example, the sensor(s) 144 may include a camera sensor, an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 144 may include a plurality of different types of devices and combine their outputs in order to provide motion information. For example, the sensor(s) 144 may use a combination of a multi-axis accelerometer and orientation sensors to provide the ability to compute positions in two-dimensional (2D) and/or three-dimensional (3D) coordinate systems.

In addition, the UE 102 includes a user interface 146 providing means for providing indications (e.g., audible and/or visual indications) to a user and/or for receiving user input (e.g., upon user actuation of a sensing device such a keypad, a touch screen, a microphone, and so on).

For convenience, the UE 102 is shown in FIG. 1 as including various components that may be configured according to the various examples described herein. It will be appreciated, however, that the illustrated components may have different functionality in different designs. In particular, various components in FIG. 1 are optional in alternative configurations and the various aspects include configurations that may vary due to design choice, costs, use of the device, or other considerations. For example, in case of FIG. 1, a particular implementation of UE 102 may omit the WWAN transceiver(s) 110 (e.g., a wearable device or tablet computer or PC or laptop may have Wi-Fi and/or Bluetooth capability without cellular capability), or may omit the short-range wireless transceiver(s) 120 (e.g., cellular-only, etc.), or may omit the satellite signal receiver 130, or may omit the sensor(s) 144, and so on. For brevity, illustration of the various alternative configurations is not provided herein, but would be readily understandable to one skilled in the art.

The various components of the UE 102 may be communicatively coupled to each other over data bus 134. In an aspect, the data bus 134 may form, or be part of, a communication interface of the UE 102. For example, where different logical entities are embodied in the same device, the data bus 134 may provide communication between them.

The components of FIG. 1 may be implemented in various ways. In some implementations, the components of FIG. 1 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 110 to 146 may be implemented by processor and memory component(s) of the UE 102 (e.g., by execution of appropriate code and/or by appropriate configuration of processor components). For simplicity, various operations, acts, and/or functions are described herein as being performed "by a UE," etc. However, as will be appreciated, such operations, acts, and/or functions may actually be performed by specific components or combinations of components of the UE 102, such as the processors 132, the transceivers 110, the memories 140, the camera sensor component 142, etc.

Figure 2:
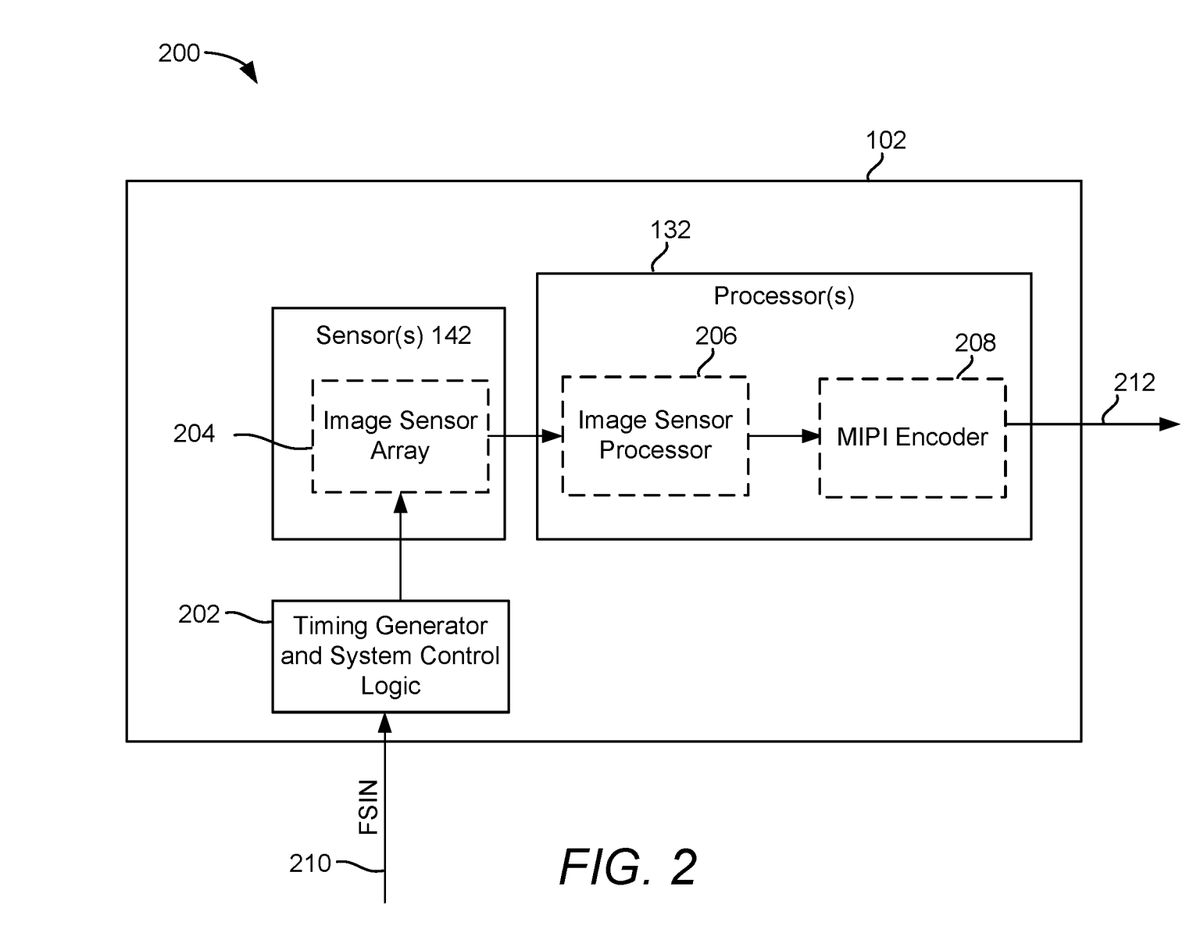
FIG. 2 is a simplified block diagram of an extended reality (XR) camera device in accordance with aspects of the disclosure.

FIG. 2 is a simplified block diagram of an extended reality (XR) camera device 200 in accordance with aspects of the disclosure. In an aspect, the XR camera device 200 (e.g., XR glasses) corresponds to an example implementation of the UE 102 of FIG. 1.

Referring to FIG. 2, the XR camera device 200 includes a timing generator and system control logic 202, sensor(s) 142 (e.g., in this case, including at least an image sensor array 204) and processor(s) 132 (e.g., in this case, including at least an image sensor processor 206 and a Mobile Industry Processor Interface (MIPI) encoder 208). In an aspect, the timing generator and system control logic 202 includes a FSIN general-purpose input/output (GPIO) that is configured to receive an FSIN trigger 210. When the FSIN trigger 210 is toggled (e.g., activated), the XR camera device 200 exits sleep mode, and image sensor array 204 captures a particular number of frames, which are processed by image sensor processor 206 and MIPI encoder 208, which outputs a series of processed frames 212 via a virtual channel (VC). After the particular number of frames is streamed via the VC, the XR camera device 200 may return to sleep mode.

As noted above, various types of UEs may be deployed. As an example, extended reality (XR) camera sensors may be equipped on smart glasses to facilitate interaction with virtual reality systems (e.g., Metaverse, etc.). In some designs, the XR camera sensors may be used for various tracking use cases, such as head tracking (HET), hand tracking (HAT), plane finding (PF), and controller tracking (CT). In some designs, the same mono camera sensor may work on one of the tracking modes (e.g., HET/HAT/PF/CT) intermittently or periodically, while most of the time operating in accordance with a trigger mode (e.g., FSIN mode). For example, the trigger mode is a mode where a camera wakes up from sleep mode in response to some event, captures and streams a particular number of activity frames, and then goes to back to sleep mode. The trigger mode is generally used in tandem with the above-noted tracking use cases to improve power and performance.

In some designs, virtual channels (VCs) are used to stream data for each mode for a given camera sensor. For example, global shutter FSIN camera sensors may be configured to stream a single VC for a single FSIN trigger. For example, to stream a single VC, a global shutter FSIN camera sensor may be configured with a VC configuration that includes (i) a sensor resolution and frames per second (FPS), stream information (e.g., VC information), and an FSIN trigger (e.g., sensor settings, a global-purpose input output (GPIO) toggle, etc.).

Figure 3:
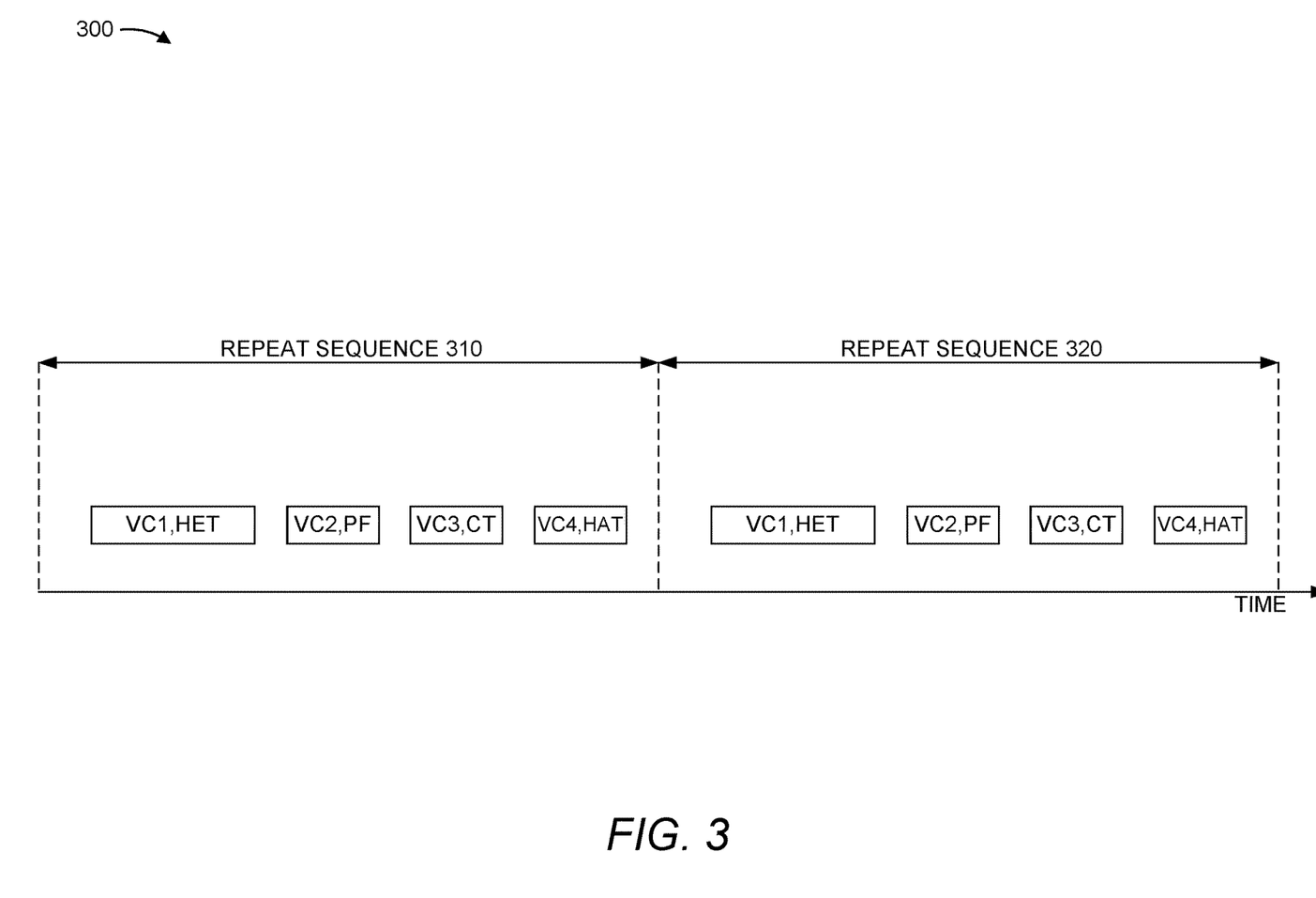
FIG. 3 illustrates a multi-virtual channel (VC) configuration for a camera sensor component in accordance with aspects of the disclosure.

In some designs, VCs for multiple tracking use cases may be configured concurrently, as depicted in FIG. 3. FIG. 3 illustrates a multi-VC configuration 300 for a camera sensor component (e.g., camera sensor component 142) in accordance with aspects of the disclosure. In FIG. 3, the multi-VC configuration 300 includes a repeat sequence 310 and a repeat sequence 320. Each respective repeat sequence includes four VCs denoted as VC1, VC2, VC3 and VC4. VC1, VC2, VC3 and VC4 are associated with tracking use-cases HET, PF, CT and HAT, respectively. The VC1, VC2, VC3 and VC4 may have different VC configurations (e.g., different number of activity frames per VC ON period, different durations, different parameters such as binning mode, etc.). Also, while shown in FIG. 3 with the same periodicity, VCs may also be configured with different periodicities.

Each VC for each tracking use case (e.g., HET, HAT, PF, CT, etc.) is typically configured individually, where the camera sensor recurrently repeats the pattern (i.e., repeat sequence) and frame(s) are processed by the algorithm(s) (e.g., HET, HAT, PF, CT, etc.) to find a respective movement or gesture. In case of FIG. 3, configuring VCs in this manner may result in significant latency (e.g., four separate VC configuration sessions to setup the VC1, VC2, VC3 and VC4).

Aspects of the disclosure are thereby directed to a multi-VC configuration session where two (or more) VCs can be setup with their own respective parameters in a single configuration session. Such aspects may provide various technical advantages, such as reduced latency associated with configuring multiple VCs for a camera sensor component.

Figure 4:
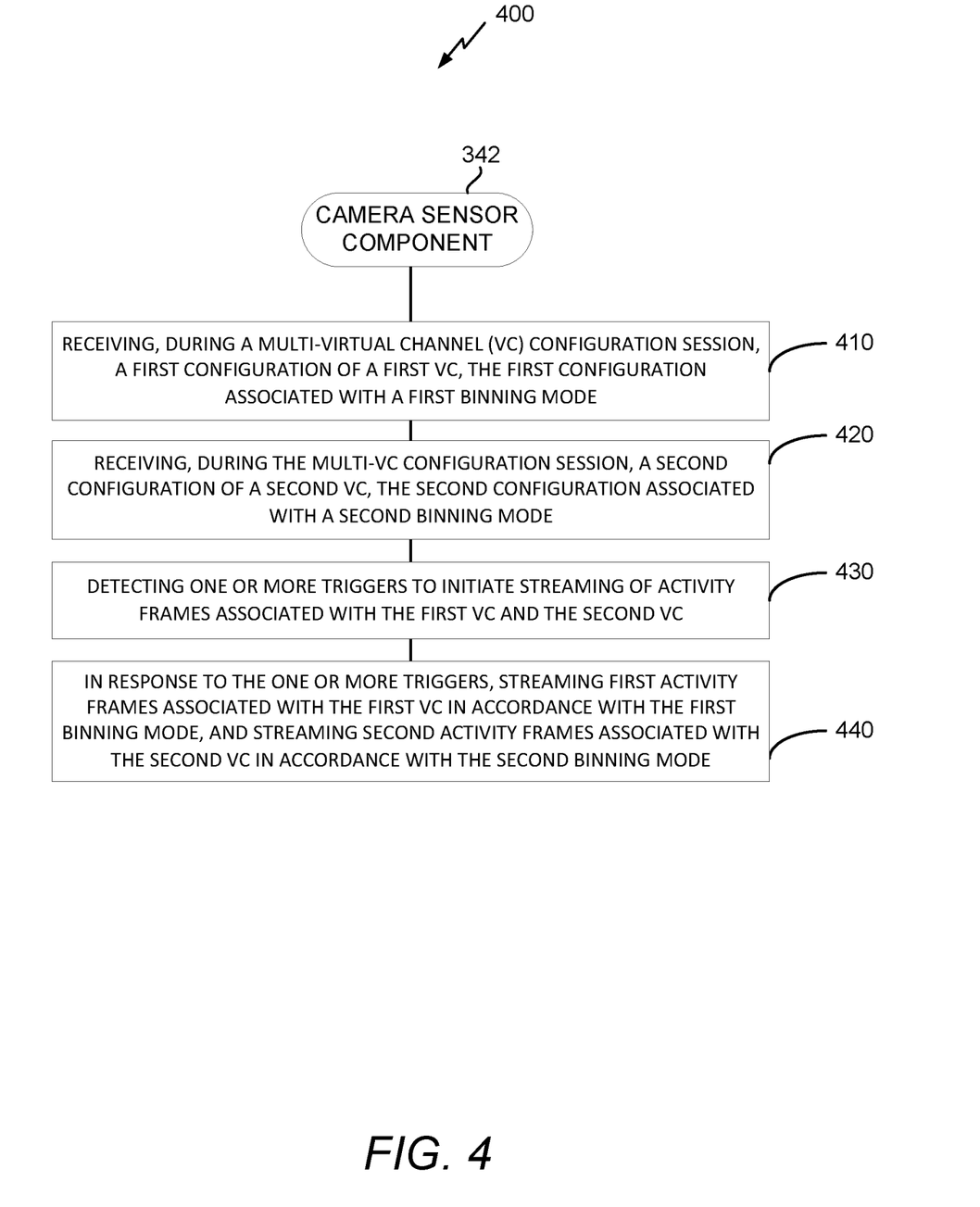
FIG. 4 illustrates an exemplary process of communications according to an aspect of the disclosure.

FIG. 4 illustrates an exemplary process 400 of communications according to an aspect of the disclosure. The process 400 of FIG. 4 is performed by a camera sensor component, which may be communicatively coupled to or equipped on a respective UE (e.g., smart glasses, smart watch, phone, etc.). For example, the camera sensor component may correspond to one of sensor(s) 144 which may also include a processor component from processor(s) 132.

Referring to FIG. 4, at 410, the camera sensor component (e.g., sensor(s) 144, processor(s) 132, camera sensor component 142, etc.) receives, during a multi-VC configuration session, a first configuration of a first VC, the first configuration associated with a first binning mode (e.g., full-mode or 1×1 binning, 4×4 binning, 8×8 binning, etc.). For example, the first configuration may include respective parameters such as periodicity, FSIN trigger, number of activity frames or duration, etc. In a further example, the multi-VC configuration session may be conducted with respect to a management component (e.g., an application processor) over data bus 134.

Referring to FIG. 4, at 420, the camera sensor component (e.g., sensor(s) 144, processor(s) 132, camera sensor component 142, etc.) receives, during the multi-VC configuration session, a second configuration of a second VC, the second configuration associated with a second binning mode (e.g., full-mode or 1×1 binning, 4×4 binning, 8×8 binning, etc.). The first and second binning modes may be the same or different. Likewise, first and second VC configurations may be the same or different. For example, the second configuration may include respective parameters such as periodicity, FSIN trigger, number of activity frames or duration, etc., which are the same or different from corresponding parameters in the first VC configuration.

Referring to FIG. 4, at 430, the camera sensor component (e.g., sensor(s) 144, processor(s) 132, camera sensor component 142, etc.) detects one or more triggers (e.g., FSIN triggers) to initiate streaming of activity frames associated with the first VC and the second VC. For example, the trigger(s) at 430 may include a time trigger associated with a repeat sequence as in FIG. 3.

Referring to FIG. 4, at 440, the camera sensor component (e.g., sensor(s) 144, processor(s) 132, camera sensor component 142, etc.), in response to the one or more triggers, stream first activity frames associated with the first VC in accordance with the first binning mode, and stream second activity frames associated with the second VC in accordance with the second binning mode. In some designs, the first and second activity frames are streamed from the camera sensor component to a Mobile Industry Processor Interface (MIPI) encoder (e.g., which may be executed by one or more of processor(s) 132) over the data bus 134. Binning modes are described in more detail below with respect to FIG. 5.

Referring to FIG. 4, in some designs, binning modes may be designed for various camera sensor objectives, such as improving low-light performance, sensitivity, signal-to-noise ratios, framerates, etc., by combining and averaging pixels. For example, binning combines adjacent pixels within same color plan to increase low light performance. In an example, the first binning mode is associated with one of 1×1 binning, 4×4 binning and 8×8 binning, or the second binning mode is associated with a different one of 1×1 binning, 4×4 binning and 8×8 binning. In case of 1×1 binning, the full size (i.e., all pixels) of a captured video frame is made part of a respective activity frame (e.g., no averaging across pixels).

Figure 5:
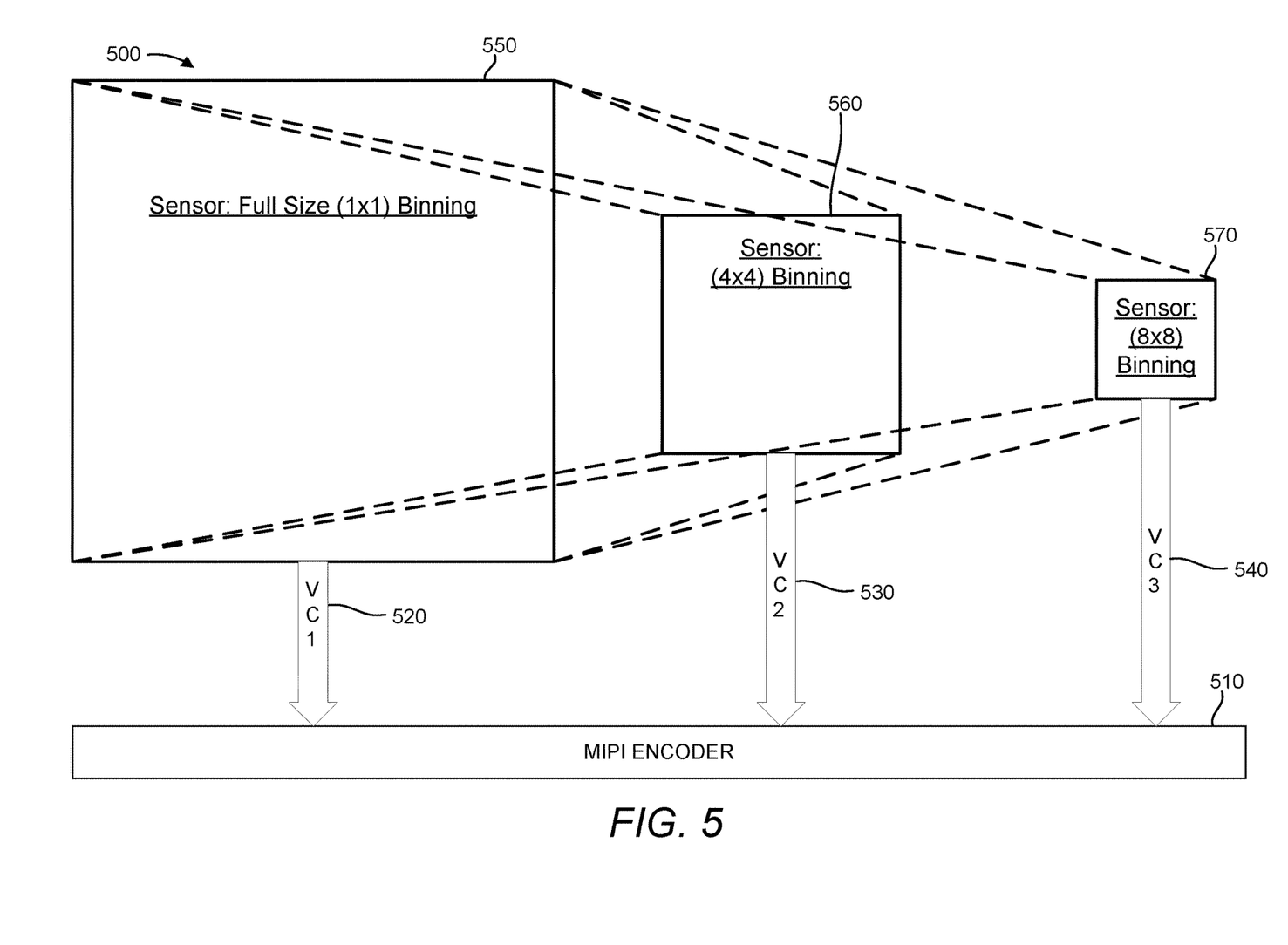
FIG. 5 illustrates an example implementation of the process of FIG. 4 in accordance with an aspect of the disclosure.

FIG. 5 illustrates an example implementation 500 of the process 400 of FIG. 4 in accordance with an aspect of the disclosure. A MIPI encoder 510 receives streams 520, 530 and 540 of activity frames associated with each of VC1, VC2 and VC3, respectively. As shown in FIG. 5, VC1 is associated with 1×1 binning as depicted at 550, VC2 is associated with 4×4 binning as depicted at 560, and VC3 is associated with 8×8 binning as depicted at 570. In a specific example, assume that a camera sensor component supports 8 megapixels (MPs) in normal preview mode, with a resolution of 3200×2400 pixels. In this specific example, VC(s) for HET/HAT may be associated with a VC configuration with a resolution of 800×600 (e.g., 4×4 binning) while VC(s) for PF/CT may be associated with a VC configuration with a resolution of 320×240 or 400×300 (e.g., 8×8 binning). In this case, in FIG. 5, VC1 streams at full size (3200×2400 or 8 MP), VC2 streams at 4×4 binned (800×600) and VC3 streams at 8×8 binned (400×300). In some designs, a single register may be used to stream VC1, VC2 and VC3.

Referring to FIG. 4, in some designs, the one or more triggers include a single trigger that triggers the streaming of the first activity frames and the second activity frames. In other designs, the one or more triggers include a first trigger that triggers the streaming of the first activity frames and a second trigger that triggers the streaming of the second activity frames.

Referring to FIG. 4, in some designs, the first VC is associated with a first periodicity and the second VC is associated with a second periodicity. In other designs, the first VC and the second VC are associated with the same periodicity.

Referring to FIG. 4, in some designs, the camera sensor component may transition to a low-power mode. During the low-power mode, the one or more triggers do not trigger streaming of the first activity frames, the second activity frames, or both. For example, lower priority VCs may be suspended during the low-power mode. In a specific example, during the low-power mode, the one or more triggers do not trigger streaming activity frames associated with plane finding (PF) or controller tracking (CT). In other words, VCs that are associated with PF or CT may be suspended during the low-power mode.

Referring to FIG. 4, in some designs, the first activity frames and the second activity frames are streamed via a single register. In some designs, each bit of the single register is allocated to a different respective VC. In a specific example, the single register may correspond to an 8-bit register. For example, consider an implementation whereby 0x1 is allocated to VC1, 0x2 is allocated to VC2, 0x4 is allocated to stream VC3, and 0x8 is allocated to stream VC4. If all four (4) of these bits are enabled 0xF (e.g., activated or set to a logic level of "1"), then all VCs (i.e., each of VC1, VC2, VC3 and VC4) will stream activity frames in a particular repeat sequence. In some designs, the application associated with particular VC(s) may request that the camera sensor component stream (or not stream) the respective VC(s) based on their respective use case (e.g., HET, HAT, PF, CT, etc.).

Referring to FIG. 4, in some designs, one or more of the first VC and the second VC are associated with head tracking (HET), hand tracking (HAT), plane finding (PF), controller tracking (CT), or a combination thereof.

Referring to FIG. 4, in some designs, the one or more triggers include one or more FSIN triggers.

Referring to FIG. 4, in some designs, the first activity frames and the second activity frames are captured within the same instance of a repeat sequence.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of operating a camera sensor component, comprising: receiving, during a multi-virtual channel (VC) configuration session, a first configuration of a first VC, the first configuration associated with a first binning mode; receiving, during the multi-VC configuration session, a second configuration of a second VC, the second configuration associated with a second binning mode; detecting one or more triggers to initiate streaming of activity frames associated with the first VC and the second VC; and in response to the one or more triggers, streaming first activity frames associated with the first VC in accordance with the first binning mode, and streaming second activity frames associated with the second VC in accordance with the second binning mode.

Clause 2. The method of clause 1, wherein the first binning mode is associated with one of 1×1 binning, 4×4 binning and 8×8 binning, or wherein the second binning mode is associated with a different one of 1×1 binning, 4×4 binning and 8×8 binning.

Clause 3. The method of any of clauses 1 to 2, wherein the one or more triggers comprise a single trigger that triggers the streaming of the first activity frames and the second activity frames.

Clause 4. The method of any of clauses 1 to 3, wherein the one or more triggers comprise a first trigger that triggers the streaming of the first activity frames and a second trigger that triggers the streaming of the second activity frames.

Clause 5. The method of any of clauses 1 to 4, wherein the first VC is associated with a first periodicity and the second VC is associated with a second periodicity.

Clause 6. The method of any of clauses 1 to 5, wherein the first VC and the second VC are associated with the same periodicity.

Clause 7. The method of any of clauses 1 to 6, further comprising: transitioning to a low-power mode, wherein, during the low-power mode, the one or more triggers do not trigger streaming of the first activity frames, the second activity frames, or both.

Clause 8. The method of clause 7, wherein, during the low-power mode, the one or more triggers do not trigger streaming activity frames associated with plane finding (PF) or controller tracking (CT).

Clause 9. The method of any of clauses 1 to 8, wherein the first activity frames and the second activity frames are streamed via a single register.

Clause 10. The method of clause 9, wherein each bit of the single register is allocated to a different respective VC.

Clause 11. The method of any of clauses 1 to 10, wherein one or more of the first VC and the second VC are associated with head tracking (HET), hand tracking (HAT), plane finding (PF), controller tracking (CT), or a combination thereof.

Clause 12. The method of any of clauses 1 to 11, wherein the one or more triggers comprise one or more FSIN triggers.

Clause 13. The method of any of clauses 1 to 12, wherein the first activity frames and the second activity frames are captured within the same instance of a repeat sequence.

Clause 14. A camera sensor component, comprising: a memory; at least one transceiver; and at least one processor communicatively coupled to the memory and the at least one transceiver, the at least one processor configured to: receive, via the at least one transceiver, during a multi-virtual channel (VC) configuration session, a first configuration of a first VC, the first configuration associated with a first binning mode; receive, via the at least one transceiver, during the multi-VC configuration session, a second configuration of a second VC, the second configuration associated with a second binning mode; detect one or more triggers to initiate streaming of activity frames associated with the first VC and the second VC; and in response to the one or more triggers, stream first activity frames associated with the first VC in accordance with the first binning mode, and stream second activity frames associated with the second VC in accordance with the second binning mode.

Clause 15. The camera sensor component of clause 14, wherein the first binning mode is associated with one of 1×1 binning, 4×4 binning and 8×8 binning, or wherein the second binning mode is associated with a different one of 1×1 binning, 4×4 binning and 8×8 binning.

Clause 16. The camera sensor component of any of clauses 14 to 15, wherein the one or more triggers comprise a single trigger that triggers the streaming of the first activity frames and the second activity frames.

Clause 17. The camera sensor component of any of clauses 14 to 16, wherein the one or more triggers comprise a first trigger that triggers the streaming of the first activity frames and a second trigger that triggers the streaming of the second activity frames.

Clause 18. The camera sensor component of any of clauses 14 to 17, wherein the first VC is associated with a first periodicity and the second VC is associated with a second periodicity.

Clause 19. The camera sensor component of any of clauses 14 to 18, wherein the first VC and the second VC are associated with the same periodicity.

Clause 20. The camera sensor component of any of clauses 14 to 19, wherein the at least one processor is further configured to: transition to a low-power mode, wherein, during the low-power mode, the one or more triggers do not trigger streaming of the first activity frames, the second activity frames, or both.

Clause 21. The camera sensor component of clause 20, wherein, during the low-power mode, the one or more triggers do not trigger streaming activity frames associated with plane finding (PF) or controller tracking (CT).

Clause 22. The camera sensor component of any of clauses 14 to 21, wherein the first activity frames and the second activity frames are streamed via a single register.

Clause 23. The camera sensor component of clause 22, wherein each bit of the single register is allocated to a different respective VC.

Clause 24. The camera sensor component of any of clauses 14 to 23, wherein one or more of the first VC and the second VC are associated with head tracking (HET), hand tracking (HAT), plane finding (PF), controller tracking (CT), or a combination thereof.

Clause 25. The camera sensor component of any of clauses 14 to 24, wherein the one or more triggers comprise one or more FSIN triggers.

Clause 26. The camera sensor component of any of clauses 14 to 25, wherein the first activity frames and the second activity frames are captured within the same instance of a repeat sequence.

Clause 27. A camera sensor component, comprising: means for receiving, during a multi-virtual channel (VC) configuration session, a first configuration of a first VC, the first configuration associated with a first binning mode; means for receiving, during the multi-VC configuration session, a second configuration of a second VC, the second configuration associated with a second binning mode; means for detecting one or more triggers to initiate streaming of activity frames associated with the first VC and the second VC; and means for, in response to the one or more triggers, streaming first activity frames associated with the first VC in accordance with the first binning mode, and streaming second activity frames associated with the second VC in accordance with the second binning mode.

Clause 28. The camera sensor component of clause 27, wherein the first binning mode is associated with one of 1×1 binning, 4×4 binning and 8×8 binning, or wherein the second binning mode is associated with a different one of 1×1 binning, 4×4 binning and 8×8 binning.

Clause 29. The camera sensor component of any of clauses 27 to 28, wherein the one or more triggers comprise a single trigger that triggers the streaming of the first activity frames and the second activity frames.

Clause 30. The camera sensor component of any of clauses 27 to 29, wherein the one or more triggers comprise a first trigger that triggers the streaming of the first activity frames and a second trigger that triggers the streaming of the second activity frames.

Clause 31. The camera sensor component of any of clauses 27 to 30, wherein the first VC is associated with a first periodicity and the second VC is associated with a second periodicity.

Clause 32. The camera sensor component of any of clauses 27 to 31, wherein the first VC and the second VC are associated with the same periodicity.

Clause 33. The camera sensor component of any of clauses 27 to 32, further comprising: means for transitioning to a low-power mode, wherein, during the low-power mode, the one or more triggers do not trigger streaming of the first activity frames, the second activity frames, or both.

Clause 34. The camera sensor component of clause 33, wherein, during the low-power mode, the one or more triggers do not trigger streaming activity frames associated with plane finding (PF) or controller tracking (CT).

Clause 35. The camera sensor component of any of clauses 27 to 34, wherein the first activity frames and the second activity frames are streamed via a single register.

Clause 36. The camera sensor component of clause 35, wherein each bit of the single register is allocated to a different respective VC.

Clause 37. The camera sensor component of any of clauses 27 to 36, wherein one or more of the first VC and the second VC are associated with head tracking (HET), hand tracking (HAT), plane finding (PF), controller tracking (CT), or a combination thereof.

Clause 38. The camera sensor component of any of clauses 27 to 37, wherein the one or more triggers comprise one or more FSIN triggers.

Clause 39. The camera sensor component of any of clauses 27 to 38, wherein the first activity frames and the second activity frames are captured within the same instance of a repeat sequence.

Clause 40. A non-transitory computer-readable medium storing computer-executable instructions that, when executed by a camera sensor component, cause the camera sensor component to: receive, during a multi-virtual channel (VC) configuration session, a first configuration of a first VC, the first configuration associated with a first binning mode; receive, during the multi-VC configuration session, a second configuration of a second VC, the second configuration associated with a second binning mode; detect one or more triggers to initiate streaming of activity frames associated with the first VC and the second VC; and in response to the one or more triggers, stream first activity frames associated with the first VC in accordance with the first binning mode, and stream second activity frames associated with the second VC in accordance with the second binning mode.

Clause 41. The non-transitory computer-readable medium of clause 40, wherein the first binning mode is associated with one of 1×1 binning, 4×4 binning and 8×8 binning, or wherein the second binning mode is associated with a different one of 1×1 binning, 4×4 binning and 8×8 binning.

Clause 42. The non-transitory computer-readable medium of any of clauses 40 to 41, wherein the one or more triggers comprise a single trigger that triggers the streaming of the first activity frames and the second activity frames.

Clause 43. The non-transitory computer-readable medium of any of clauses 40 to 42, wherein the one or more triggers comprise a first trigger that triggers the streaming of the first activity frames and a second trigger that triggers the streaming of the second activity frames.

Clause 44. The non-transitory computer-readable medium of any of clauses 40 to 43, wherein the first VC is associated with a first periodicity and the second VC is associated with a second periodicity.

Clause 45. The non-transitory computer-readable medium of any of clauses 40 to 44, wherein the first VC and the second VC are associated with the same periodicity.

Clause 46. The non-transitory computer-readable medium of any of clauses 40 to 45, further comprising computer-executable instructions that, when executed by the camera sensor component, cause the camera sensor component to: transition to a low-power mode, wherein, during the low-power mode, the one or more triggers do not trigger streaming of the first activity frames, the second activity frames, or both.

Clause 47. The non-transitory computer-readable medium of clause 46, wherein, during the low-power mode, the one or more triggers do not trigger streaming activity frames associated with plane finding (PF) or controller tracking (CT).

Clause 48. The non-transitory computer-readable medium of any of clauses 40 to 47, wherein the first activity frames and the second activity frames are streamed via a single register.

Clause 49. The non-transitory computer-readable medium of clause 48, wherein each bit of the single register is allocated to a different respective VC.

Clause 50. The non-transitory computer-readable medium of any of clauses 40 to 49, wherein one or more of the first VC and the second VC are associated with head tracking (HET), hand tracking (HAT), plane finding (PF), controller tracking (CT), or a combination thereof.

Clause 51. The non-transitory computer-readable medium of any of clauses 40 to 50, wherein the one or more triggers comprise one or more FSIN triggers.

Clause 52. The non-transitory computer-readable medium of any of clauses 40 to 51, wherein the first activity frames and the second activity frames are captured within the same instance of a repeat sequence.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a camera sensor component, comprising:
   receiving, during a multi-virtual channel (VC) configuration session, a first configuration of a first VC, the first configuration associated with a first binning mode;
   receiving, during the multi-VC configuration session, a second configuration of a second VC, the second configuration associated with a second binning mode;
   detecting, after the multi-VC configuration session, one or more triggers to initiate streaming of activity frames associated with the first VC and the second VC; and
   in response to the one or more triggers, streaming first activity frames associated with the first VC in accordance with the first binning mode, and streaming second activity frames associated with the second VC in accordance with the second binning mode.

2. The method of claim 1, wherein the first binning mode is associated with one of 1×1 binning, 4×4 binning and 8×8 binning, or wherein the second binning mode is associated with a different one of 1×1 binning, 4×4 binning and 8×8 binning.

3. The method of claim 1, wherein the one or more triggers comprise a single trigger that triggers the streaming of the first activity frames and the second activity frames.

4. The method of claim 1, wherein the one or more triggers comprise a first trigger that triggers the streaming of the first activity frames and a second trigger that triggers the streaming of the second activity frames.

5. The method of claim 1, wherein the first VC is associated with a first periodicity and the second VC is associated with a second periodicity.

6. The method of claim 1, wherein the first VC and the second VC are associated with the same periodicity.

7. The method of claim 1, further comprising:
transitioning to a low-power mode,
wherein, during the low-power mode, the one or more triggers do not trigger streaming of the first activity frames, the second activity frames, or both.

8. The method of claim 7, wherein, during the low-power mode, the one or more triggers do not trigger streaming activity frames associated with plane finding (PF) or controller tracking (CT).

9. The method of claim 1, wherein the first activity frames and the second activity frames are streamed via a single register.

10. The method of claim 9, wherein each bit of the single register is allocated to a different respective VC.

11. The method of claim 1, wherein one or more of the first VC and the second VC are associated with head tracking (HET), hand tracking (HAT), plane finding (PF), controller tracking (CT), or a combination thereof.

12. The method of claim 1, wherein the one or more triggers comprise one or more FSIN triggers.

13. The method of claim 1, wherein the first activity frames and the second activity frames are captured within the same instance of a repeat sequence.

14. A camera sensor component, comprising:
a memory;
at least one transceiver; and
at least one processor communicatively coupled to the memory and the at least one transceiver, the at least one processor configured to:
receive, via the at least one transceiver, during a multi-virtual channel (VC) configuration session, a first configuration of a first VC, the first configuration associated with a first binning mode;
receive, via the at least one transceiver, during the multi-VC configuration session, a second configuration of a second VC, the second configuration associated with a second binning mode;
detect, after the multi-VC configuration session, one or more triggers to initiate streaming of activity frames associated with the first VC and the second VC; and
in response to the one or more triggers,
stream first activity frames associated with the first VC in accordance with the first binning mode, and stream second activity frames associated with the second VC in accordance with the second binning mode.

15. The camera sensor component of claim 14,
wherein the first binning mode is associated with one of 1×1 binning, 4×4 binning and 8×8 binning, or
wherein the second binning mode is associated with a different one of 1×1 binning, 4×4 binning and 8×8 binning.

16. The camera sensor component of claim 14, wherein the one or more triggers comprise a single trigger that triggers the streaming of the first activity frames and the second activity frames.

17. The camera sensor component of claim 14, wherein the one or more triggers comprise a first trigger that triggers the streaming of the first activity frames and a second trigger that triggers the streaming of the second activity frames.

18. The camera sensor component of claim 14, wherein the first VC is associated with a first periodicity and the second VC is associated with a second periodicity.

19. The camera sensor component of claim 14, wherein the first VC and the second VC are associated with the same periodicity.

20. The camera sensor component of claim 14, wherein the at least one processor is further configured to:
transition to a low-power mode,
wherein, during the low-power mode, the one or more triggers do not trigger streaming of the first activity frames, the second activity frames, or both.

21. The camera sensor component of claim 20, wherein, during the low-power mode, the one or more triggers do not trigger streaming activity frames associated with plane finding (PF) or controller tracking (CT).

22. The camera sensor component of claim 14, wherein the first activity frames and the second activity frames are streamed via a single register.

23. The camera sensor component of claim 22, wherein each bit of the single register is allocated to a different respective VC.

24. The camera sensor component of claim 14, wherein one or more of the first VC and the second VC are associated with head tracking (HET), hand tracking (HAT), plane finding (PF), controller tracking (CT), or a combination thereof.

25. The camera sensor component of claim 14, wherein the one or more triggers comprise one or more FSIN triggers.

26. The camera sensor component of claim 14, wherein the first activity frames and the second activity frames are captured within the same instance of a repeat sequence.

27. A camera sensor component, comprising:
means for receiving, during a multi-virtual channel (VC) configuration session, a first configuration of a first VC, the first configuration associated with a first binning mode;
means for receiving, during the multi-VC configuration session, a second configuration of a second VC, the second configuration associated with a second binning mode;
means for detecting, after the multi-VC configuration session, one or more triggers to initiate streaming of activity frames associated with the first VC and the second VC; and
means for, in response to the one or more triggers, streaming first activity frames associated with the first VC in accordance with the first binning mode, and streaming second activity frames associated with the second VC in accordance with the second binning mode.

28. The camera sensor component of claim 27,
wherein the first binning mode is associated with one of 1×1 binning, 4×4 binning and 8×8 binning, or
wherein the second binning mode is associated with a different one of 1×1 binning, 4×4 binning and 8×8 binning.

29. A non-transitory computer-readable medium storing computer-executable instructions that, when executed by a camera sensor component, cause the camera sensor component to:
receive, during a multi-virtual channel (VC) configuration session, a first configuration of a first VC, the first configuration associated with a first binning mode;
receive, during the multi-VC configuration session, a second configuration of a second VC, the second configuration associated with a second binning mode;
detect, after the multi-VC configuration session, one or more triggers to initiate streaming of activity frames associated with the first VC and the second VC; and
in response to the one or more triggers,
stream first activity frames associated with the first VC in accordance with the first binning mode, and
stream second activity frames associated with the second VC in accordance with the second binning mode.

30. The non-transitory computer-readable medium of claim 29,
wherein the first binning mode is associated with one of 1×1 binning, 4×4 binning and 8×8 binning, or
wherein the second binning mode is associated with a different one of 1×1 binning, 4×4 binning and 8×8 binning.

* * * * *